(12) United States Patent
Elshafie et al.

(10) Patent No.: US 11,844,145 B2
(45) Date of Patent: Dec. 12, 2023

(54) USER EQUIPMENT SIGNALING AND CAPABILITIES TO ENABLE FEDERATED LEARNING AND SWITCHING BETWEEN MACHINE LEARNING AND NON-MACHINE LEARNING RELATED TASKS

(71) Applicant: QUALCOMM Incorporated, San Diego, CA (US)

(72) Inventors: Ahmed Elshafie, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/303,854

(22) Filed: Jun. 9, 2021

(65) Prior Publication Data

US 2022/0400371 A1    Dec. 15, 2022

(51) Int. Cl.
*H04W 8/24* (2009.01)
*G06N 20/00* (2019.01)
*H04B 7/06* (2006.01)
*H04L 5/00* (2006.01)
*H04L 25/02* (2006.01)

(52) U.S. Cl.
CPC .............. *H04W 8/24* (2013.01); *G06N 20/00* (2019.01); *H04B 7/0626* (2013.01); *H04L 5/0051* (2013.01); *H04L 25/0226* (2013.01)

(58) Field of Classification Search
CPC ........ G06N 20/00; G06N 3/045; G06N 3/063; G06N 3/08; H04B 7/0626; H04L 5/0051; H04L 25/0226; H04W 8/24; H04W 24/02
See application file for complete search history.

(56) References Cited

U.S. PATENT DOCUMENTS

| | | | |
|---|---|---|---|
| 2019/0277957 A1* | 9/2019 | Chandrasekhar | G01S 5/017 |
| 2020/0050178 A1* | 2/2020 | Gao | G06N 20/00 |
| 2020/0057561 A1* | 2/2020 | Lai | G06N 3/063 |
| 2020/0249743 A1* | 8/2020 | Kumar Addepalli | G06F 1/3237 |
| 2020/0366326 A1* | 11/2020 | Jassal | H04L 41/16 |
| 2020/0367051 A1* | 11/2020 | Wang | H04W 8/245 |

(Continued)

OTHER PUBLICATIONS

"Distributed Learning for Wireless Communications: Methods, Applications and Challenges"; Qian et al.; IEEE Journal of Selected Topics in Signal Processing, vol. 16, No. 3, Apr. 2022 (Year: 2022).*

(Continued)

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, capability information that indicates whether the UE has a capability to support machine learning algorithms. The UE may receive, from the base station, configuration information that indicates one or more tasks to be performed in a machine learning mode or a non-machine learning mode based at least in part on the capability information. The UE may perform the one or more tasks in the machine learning mode or the non-machine learning mode. Numerous other aspects are described.

26 Claims, 8 Drawing Sheets

(56) References Cited

U.S. PATENT DOCUMENTS

| | | | |
|---|---|---|---|
| 2021/0092069 A1* | 3/2021 | Musleh | H04L 45/08 |
| 2021/0097979 A1* | 4/2021 | Roorda | G06N 3/088 |
| 2021/0160149 A1* | 5/2021 | Ma | H04L 41/0803 |
| 2022/0167148 A1* | 5/2022 | Kim | H04L 25/0204 |
| 2022/0179560 A1* | 6/2022 | Liu | G06F 3/067 |
| 2022/0287104 A1* | 9/2022 | Jeon | G06N 20/00 |
| 2022/0318657 A1* | 10/2022 | Liu | H04L 67/59 |
| 2022/0343167 A1* | 10/2022 | Chawla | G06N 5/01 |
| 2022/0393781 A1* | 12/2022 | Kim | G06N 3/08 |
| 2022/0400371 A1* | 12/2022 | Elshafie | H04W 8/24 |
| 2023/0049550 A1* | 2/2023 | Roy | G06F 18/213 |

OTHER PUBLICATIONS

"FedLoc: Federated Learning Framework for Data-Driven Cooperative Localization and Location Data Processing"; Yin et al.; IEEE Open Journal of Signal Processing, vol. 1; Received May 24, 2020; revised Oct. 19, 2020; accepted Oct. 23, 2020. Date of publication Nov. 6, 2020 (Year: 2020).*

"Learning based Transmitter/Receiver Design for the Nonlinear Channel"; Namgoong et al.; ICC 2021—IEEE International Conference on Communications (Year: 2021).*

International Search Report and Written Opinion—PCT/US2022/072550—ISA/EPO—dated Oct. 17, 2022.

\* cited by examiner

USER EQUIPMENT SIGNALING AND CAPABILITIES TO ENABLE FEDERATED LEARNING AND SWITCHING BETWEEN MACHINE LEARNING AND NON-MACHINE LEARNING RELATED TASKS

FIELD OF THE DISCLOSURE

Aspects of the present disclosure generally relate to wireless communication and to techniques and apparatuses for user equipment (UE) signaling and capabilities to enable federated learning and switching between machine learning and non-machine learning tasks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, capability information that indicates whether the UE has a capability to support machine learning algorithms; receiving, from the base station, configuration information that indicates one or more tasks to be performed in a machine learning mode or a non-machine learning mode based at least in part on the capability information; and performing the one or more tasks in the machine learning mode or the non-machine learning mode.

In some aspects, a method of wireless communication performed by a base station includes receiving, from a UE, capability information that indicates whether the UE has a capability to support machine learning algorithms; and transmitting, to the UE, configuration information that indicates one or more tasks to be performed in a machine learning mode or a non-machine learning mode based at least in part on the capability information.

In some aspects, a UE for wireless communication includes a memory and one or more processors, coupled to the memory, configured to: transmit, to a base station, capability information that indicates whether the UE has a capability to support machine learning algorithms; receive, from the base station, configuration information that indicates one or more tasks to be performed in a machine learning mode or a non-machine learning mode based at least in part on the capability information; and perform the one or more tasks in the machine learning mode or the non-machine learning mode.

In some aspects, a base station for wireless communication includes a memory and one or more processors, coupled to the memory, configured to: receive, from a UE, capability information that indicates whether the UE has a capability to support machine learning algorithms; and transmit, to the UE, configuration information that indicates one or more tasks to be performed in a machine learning mode or a non-machine learning mode based at least in part on the capability information.

In some aspects, a non-transitory computer-readable medium storing a set of instructions for wireless communication includes one or more instructions that, when executed by one or more processors of a UE, cause the UE to: transmit, to a base station, capability information that indicates whether the UE has a capability to support machine learning algorithms; receive, from the base station, configuration information that indicates one or more tasks to be performed in a machine learning mode or a non-machine learning mode based at least in part on the capability information; and perform the one or more tasks in the machine learning mode or the non-machine learning mode.

In some aspects, a non-transitory computer-readable medium storing a set of instructions for wireless communication includes one or more instructions that, when executed by one or more processors of a base station, cause the base station to: receive, from a UE, capability information that indicates whether the UE has a capability to support machine learning algorithms; and transmit, to the UE, configuration information that indicates one or more tasks to be performed in a machine learning mode or a non-machine learning mode based at least in part on the capability information.

In some aspects, an apparatus for wireless communication includes means for transmitting, to a base station, capability information that indicates whether the apparatus has a capability to support machine learning algorithms; means for receiving, from the base station, configuration information that indicates one or more tasks to be performed in a machine learning mode or a non-machine learning mode based at least in part on the capability information; and means for performing the one or more tasks in the machine learning mode or the non-machine learning mode.

In some aspects, an apparatus for wireless communication includes means for receiving, from a UE, capability information that indicates whether the UE has a capability to support machine learning algorithms; and means for transmitting, to the UE, configuration information that indicates one or more tasks to be performed in a machine learning mode or a non-machine learning mode based at least in part on the capability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
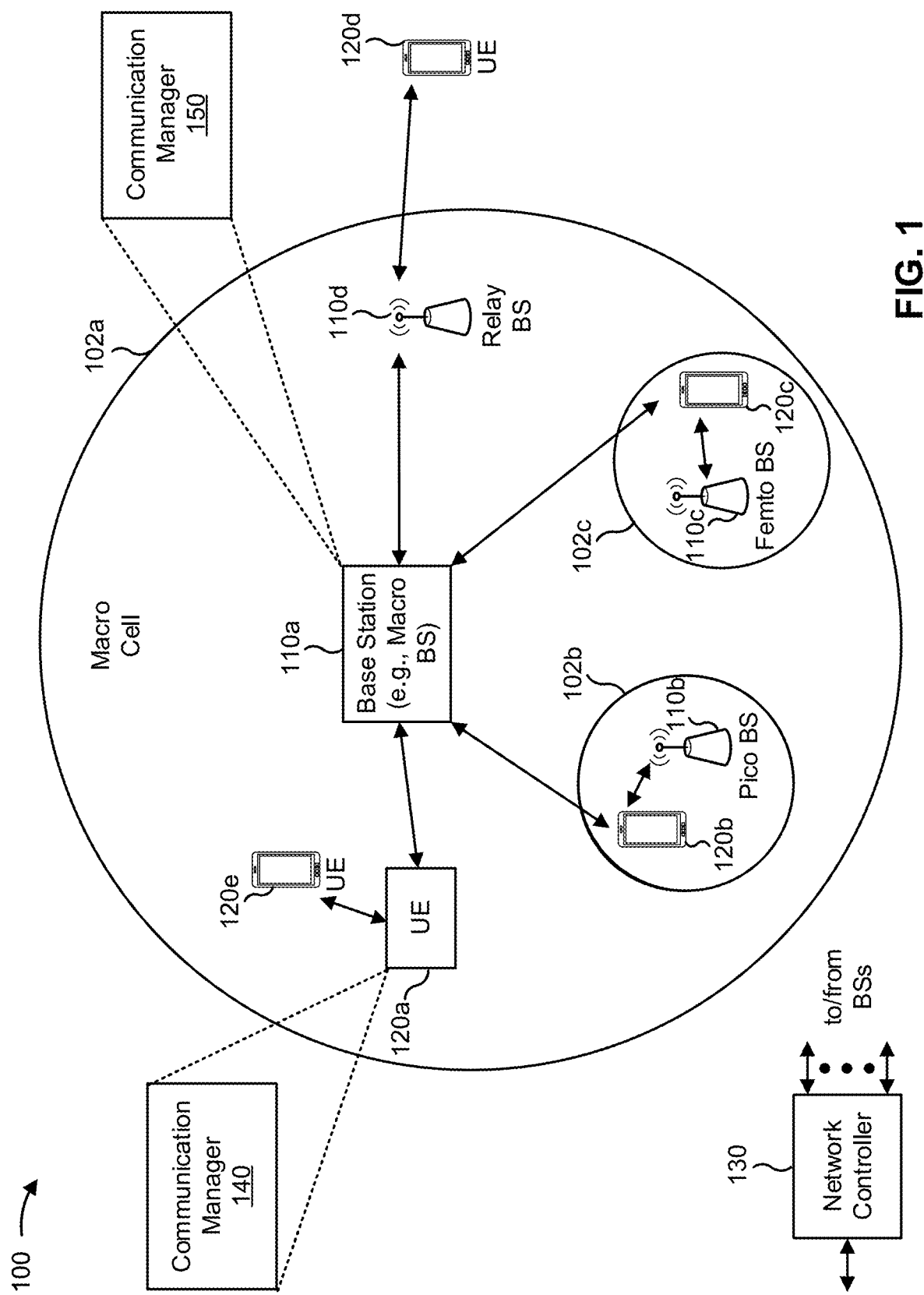
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit, to a base station, capability information that indicates whether the UE has a capability to support machine learning algorithms; receive, from the base station, configuration information that indicates one or more tasks to be performed in a machine learning mode or a non-machine learning mode based at least in part on the capability information; and perform the one or more tasks in the machine learning mode or the non-machine learning mode. Additionally, or alternatively, the communication manager 140 may perform one or more other operations described herein.

In some aspects, the base station 110 may include a communication manager 150. As described in more detail elsewhere herein, the communication manager 150 may receive, from the UE 120, capability information that indicates whether the UE 120 has a capability to support machine learning algorithms; and transmit, to the UE 120, configuration information that indicates one or more tasks to be performed in a machine learning mode or a non-machine learning mode based at least in part on the capability information. Additionally, or alternatively, the communication manager 150 may perform one or more other operations described herein.

As indicated above, FIG. 1 is provided as an example. Other examples may differ from what is described with regard to FIG. 1.

Figure 2:
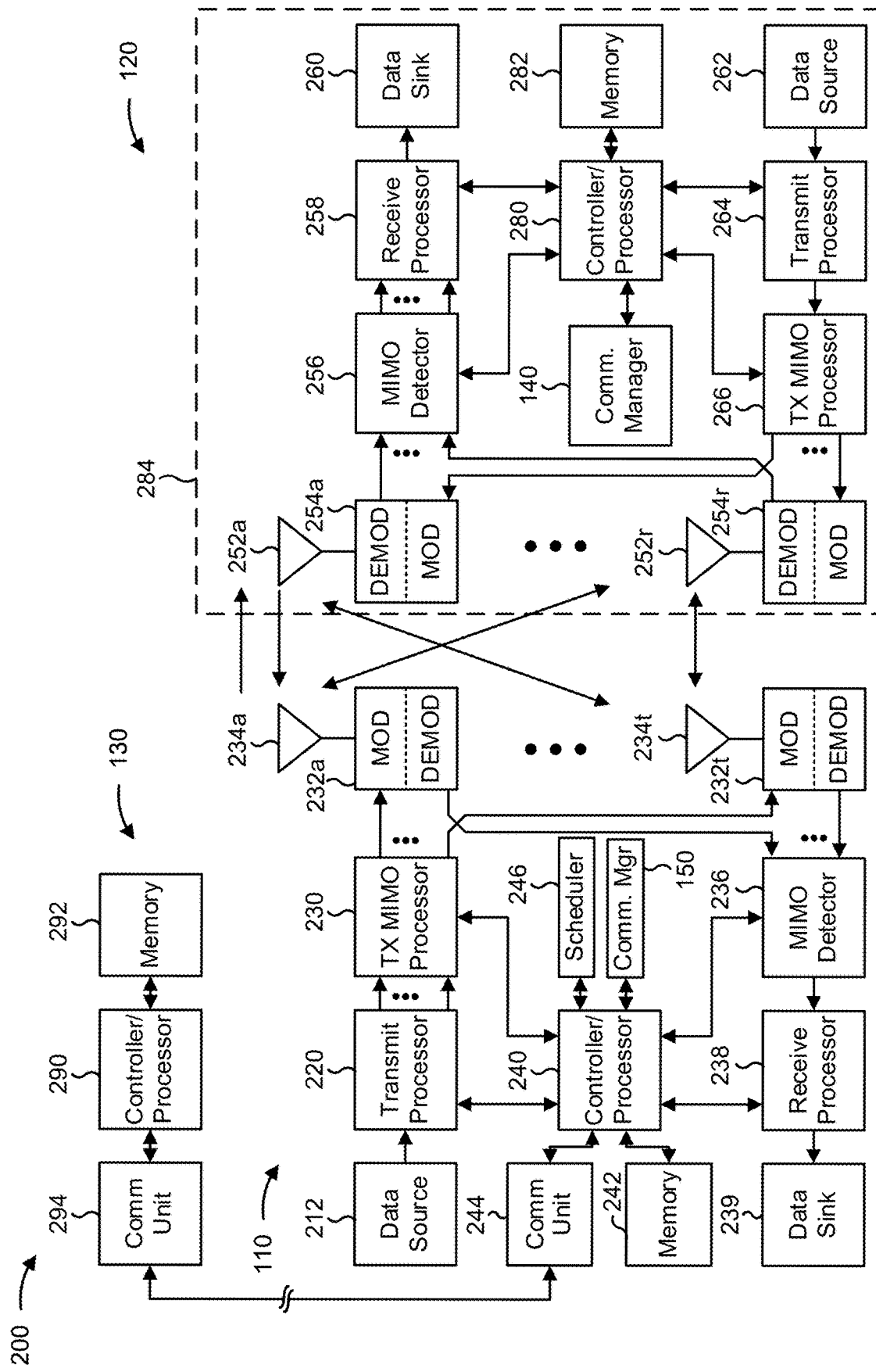
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 3-6).

Controller/processor 240 of base station 110, controller/processor 280 of UE 120, and/or any other component(s) of FIG. 2 may perform one or more techniques associated with UE signaling and capabilities to enable federated learning and switching between machine learning and non-machine learning tasks, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for transmitting, to the base station 110, capability information that indicates whether the UE 120 has a capability to support machine learning algorithms; means for receiving, from the base station 110, configuration information that indicates one or more tasks to be performed in a machine learning mode or a non-machine learning mode based at least in part on the capability information; and/or means for performing the one or more tasks in the machine learning mode or the non-machine learning mode. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for receiving, from the UE 120, capability information that indicates whether the UE 120 has a capability to support machine learning algorithms; and/or means for transmitting, to the UE 120, configuration information that indicates one or more tasks to be performed in a machine learning mode or a non-machine learning mode based at least in part on the capability information. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
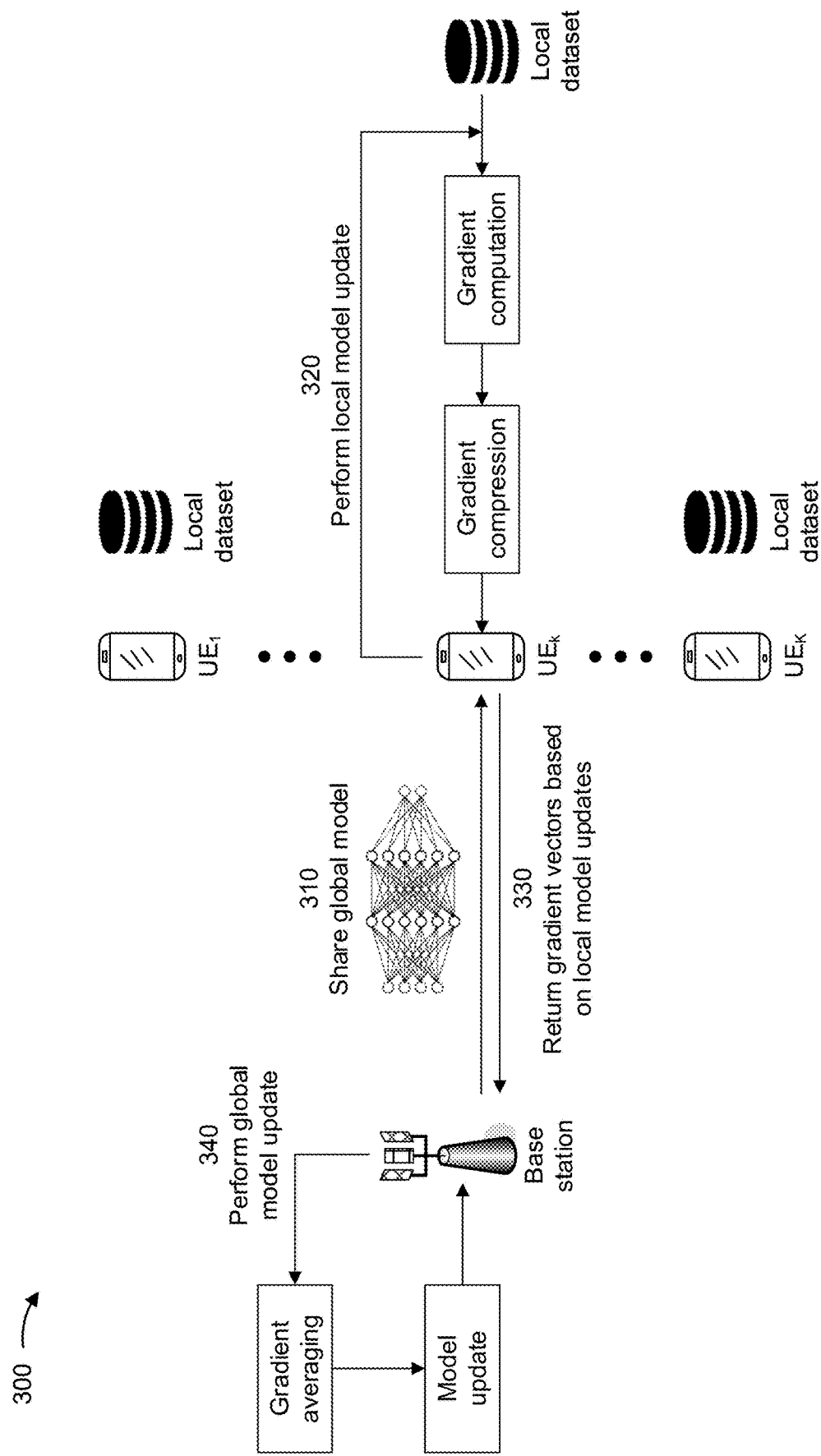
FIG. 3 is a diagram illustrating an example associated with federated learning in a wireless network, in accordance with the present disclosure.

FIG. 3 is a diagram illustrating an example 300 associated with federated learning in a wireless network, in accordance with the present disclosure.

Machine learning components are being used more and more to perform a variety of different types of operations. A machine learning component is a software component of a device (e.g., a client device, a server device, a UE, and/or a base station) that performs one or more machine learning procedures and/or that works with one or more other software and/or hardware components to perform one or more machine learning procedures in a machine learning mode. In one or more examples, a machine learning component may include, for example, software that may learn to perform a procedure without being explicitly trained to perform the procedure. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples.

In one or more examples, machine learning components may be distributed in a network. For example, a server device may provide a machine learning component to one or more client devices. The machine learning component may be trained using federated learning. Federated learning (also known as collaborative learning) is a machine learning technique that enables multiple clients to collaboratively train machine learning components in a decentralized manner. In federated learning, a client device may use local training data to perform a local training operation associated with the machine learning component. For example, the client device may use local training data to train the machine learning component. Local training data is training data that is generated by, collected by, and/or stored at the client device without being exchanged with other nodes that are participating in the federated learning.

In federated learning, a client device may generate a local update associated with the machine learning component based at least in part on the local training operation. A local update is information associated with the machine learning component that reflects a change to the machine learning component that occurs as a result of the local training operation. For example, a local update may include the locally updated machine learning component (e.g., updated as a result of the local training operation), data indicating one or more aspects (e.g., parameter values, output values, weights) of the locally updated machine learning component, a set of gradients associated with a loss function corresponding to the locally updated machine learning component, and/or a set of parameters (e.g., neural network weights) corresponding to the locally updated machine learning component, among other examples.

In federated learning, the client device may provide the local update to the server device. The server device may collect local updates from one or more client devices and use the local updates to update a global version of the machine learning component that is maintained at the server device. An update associated with the global version of the machine learning component that is maintained at the server device may be referred to as a global update. A global update is information associated with the machine learning component that reflects a change to the machine learning component that occurs based at least in part on one or more local updates and/or a server update. A server update is information associated with the machine learning component that reflects a change to the machine learning component that occurs as a result of a training operation performed by the server device. In one or more examples, a server device may generate a global update by aggregating a number of local updates to generate an aggregated update and applying the aggregated update to the machine learning component.

In some aspects, after collecting the local updates from the client device(s) and using the local updates to update the global version of the machine learning component, the server device may provide the global update to the client device(s). A client device may apply a global update received from a server device to the machine learning component (e.g., to the locally-stored copy of the machine learning component). In this way, a number of client devices may be able to contribute to the training of a machine learning component and a server device may be able to distribute global updates so that each client device maintains a current, updated version of the machine learning component. Federated learning also may facilitate privacy of training data because the server device may generate global updates based on local updates and without collecting the local training data associated with the client devices.

In some cases, the exchange of information in federated learning may be performed over wireless local area network (WLAN) connections, where limited and/or costly communication resources may be of relatively low concern due to wired connections associated with modems, routers, and/or other network infrastructure. However, implementing federated learning using machine learning components in a cellular context may improve network performance and user experience in a wireless network. In the cellular context, for example, a server device may be, include, or be included in a base station, and a client device may be, include, or be included in a UE. Accordingly, in a wireless network, such as an LTE network or an NR network, a UE operating in a network may utilize a machine learning component for any number of different types of operations, transmissions, user experience enhancements, and/or the like. For example, in some cases, a base station may configure a UE to perform one or more tasks (e.g., related to wireless communication, positioning, and/or user interface interactions, among other examples) in a machine learning mode and to report information associated with the machine learning tasks to the base station. For example, in the machine learning mode, a UE may be configured to obtain measurements associated with downlink reference signals (e.g., a channel state information reference signal (CSI-RS), transmit an uplink reference signal (e.g., a sounding reference signal (SRS)), measure reference signals during a beam management process for providing channel state feedback (CSF) in a channel state information (CSI) report, measure received power of reference signals from a serving cell and/or neighbor cells, measure signal strength of inter-radio access technology (e.g., WLAN) networks, measure sensor signals for detecting locations of one or more objects within an environment, and/or collect data related to user interactions with the UE, among other examples. In this way, federated learning may enable improvements to network performance and/or user experience by leveraging the local machine learning capabilities of one or more UEs.

For example, as shown in FIG. 3, federated learning for machine learning components may be performed by a base station communicating with a set of K UEs (shown as "$UE_1, \ldots, UE_k, \ldots,$ and $UE_K$") that are participating in federated learning. The base station and the UEs may communicate with one another via a wireless network (e.g., the wireless network 100 shown in FIG. 1). In some aspects, any number of additional UEs may be included in the set of K UEs.

As shown in FIG. 3, and by reference number 310, the base station may share a global federated learning model (e.g., a machine learning component) with the K UEs that are participating in federated learning. For example, in some aspects, the base station may transmit the global federated learning model to the UEs on a downlink, or the base station may transmit information to the UEs that indicates a network location where the UEs are to download or otherwise obtain the federated learning model. In some aspects, each UE participating in the federated learning may be configured to perform one or more wireless communication tasks and/or one or more user interface tasks in a machine learning mode in order to train a local version of the federated learning model.

In some aspects, as shown by reference number 320, the UEs participating in the federated learning may perform a local model update by locally training the federated learning model using local training data collected by the UEs, respectively. A UE may train a federated learning model, such as a neural network, by optimizing a set of model parameters, $w^{(n)}$, associated with the federated learning model, where n is a federated learning round index. As described herein, the UEs participating in the federated learning may be configured to provide updates to the base station one or more times (e.g., periodically, on demand, and/or upon updating the local version of the federated learning model, among other examples). For example, in some aspects, the UEs may be configured to perform federated learning rounds in which the set of model parameters are optimized using the local training data, and an update is provided to the base station until a global federated learning accuracy requirement is satisfied (e.g., until a global federated learning algorithm converges).

As described herein, a "federated learning round" refers to the local training performed by the UE that corresponds to an update provided by the UE to the base station. In some aspects, "federated learning round" may refer to the transmission by a UE, and the reception by the base station, of an update to the federated learning model. The federated learning round index n may indicate a number of federated learning rounds since the most recent global update was transmitted from the base station to the UE. The initial provisioning of a federated learning model on a UE and/or the transmission of a global update to the federated learning model to a UE may trigger the beginning of a new federated learning round.

In some aspects, for example, a UE participating in a federated learning round may determine an update corresponding to the federated learning model by training the federated learning model. In some aspects, as shown, the UEs may collect local training data and store the local training data in a memory device. The stored training data may be referred to as a "local dataset," which the UEs may use to perform the local update associated with the federated learning model.

In some aspects, for example, a UE may access the local training data (e.g., the local dataset) from the memory device and use the local training data to determine an input vector, $x_j$, to be input into the federated learning model to generate a training output, $y_j$, from the federated learning model. The input vector $x_j$ may include an array of input values, and the training output $y_j$ may include a value (e.g., a value between 0 and 9).

The training output $y_j$ may be used to facilitate determining the model parameters $w^{(n)}$ that maximize a variational lower bound function. A negative variational lower bound function, which is the negative of the variational lower bound function, may correspond to a local loss function, $F_k(w)$, which may be expressed as:

$$F_k(w) = \frac{1}{|D_k|} \sum_{(x_j, y_j) \in D_k} f(w, x_j, y_j),$$

where $|D_k|$ is the size of the local dataset $D_k$ associated with $UE_k$. In some aspects, a stochastic gradient descent (SGD) algorithm may be used to optimize the model parameters $w^{(n)}$ in a decentralized manner. For example, each UE may perform one or more SGD procedures to determine the optimized parameters $w^{(n)}$ and may perform a gradient computation to determine the gradients, $g_k^{(n)} = \nabla F_k(w^{(n)})$, of the local loss function F(w). The UEs may further refine the federated learning model based at least in part on the value of the local loss function and/or the gradients, among other examples. As further shown in FIG. 3, in some aspects, a UE may perform gradient compression to generate a compressed set of gradients, $\tilde{g}_k^{(n)} = q(g_k^{(n)})$, where q represents a compression scheme applied to the set of gradients $g_k^{(n)}$.

In this way, by performing one or more iterations of the SGD algorithm to train the federated learning model and determine the gradients $g_k^{(n)}$, a UE may determine a local update corresponding to the federated learning model. Each repetition of the local training procedure described herein may be referred to as an epoch. In some aspects, the local update may include an updated set of model parameters $w^{(n)}$, a difference between the updated set of model parameters $w^{(n)}$ and a prior set of model parameters $w^{(n-1)}$, the set of gradients $g_k^{(n)}$, and/or an updated federated learning model (e.g., an updated neural network model), among other examples.

As shown by reference number 330, the UEs may transmit, to the base station, respective local updates to the federated learning model. In some aspects, the local update transmitted by a particular UE may include the local update applied by the UE or a compressed version of the local update applied by the UE. For example, in some aspects, a UE may feed back the gradient vectors $g_k^{(n)}$ computed by the UE or a compressed set of gradients $\tilde{g}_k^{(n)}$ generated by applying a compression scheme to the set of gradients $g_k^{(n)}$.

As described above, a "round" may generally refer to the process of generating a local update at a UE and providing the local update to the base station. In some aspects, a "round" may refer to the training, generation, and uploading of local updates by all of the UEs in a set of UEs participating in a federated learning procedure. The round may include the procedure described herein in which the base station aggregates the local updates from various UEs and determines a global update based at least in part on the aggregated local updates. In some aspects, the round may include transmitting the global update to the UEs. In aspects, a round may include any number of epochs performed by one or more UEs.

As shown in FIG. 3, and by reference number 340, the base station may perform a global model update by aggregating the feedback received from the UEs related to the local updates applied by the UEs. For example, as shown, the base station may average the received gradients (or compressed gradient values) to determine an aggregated update, which may be expressed as $$g^{(n)} = \frac{1}{K} \sum_{k=1}^{K} g_k^{(n)},$$

where, as explained above, K is the total number of UEs participating in federated learning (e.g., a number of UEs that provided local updates to the base station). In some examples, the base station may aggregate the local updates received from the UEs participating in federated learning using any suitable aggregation technique. As further shown in FIG. 3, the base station may update the global federated learning model based on the aggregated (e.g., averaged) local updates. In some aspects, for example, the base station may update the global federated learning model by normalizing a size of the local datasets by treating each dataset size, $|D_k|$, as being equal. The base station may update the global federated learning model using multiple rounds of local updates from the UEs until a global federated learning accuracy requirement is satisfied (e.g., until a global federated learning algorithm converges). For example, in some aspects, the process of sharing the global federated model with the UEs, performing local updates through a decentralized SGD algorithm, and updating the global federated model based on aggregated local updates may be repeated until a global loss function is minimized, where the global loss function may be given by:

$$F(w) = \frac{\sum_{k=1}^{K} \sum_{j \in D_k} f_j(w)}{K*D} = \frac{1}{K} \sum_{k=1}^{K} F_k(w),$$

where $|D_k|=D$, and where D is a normalized constant. In some aspects, the base station may transmit an update associated with the updated global federated learning model to the UEs.

Accordingly, in order to enable federated learning in a wireless network, each UE participating in the federated learning may need to support machine learning algorithms in order to perform the local training procedure. However, UEs that communicate with a base station in a wireless network may not universally support machine learning algorithms (e.g., a UE may have limited computational resources that prevent the UE from participating in machine learning algorithms), and in some cases, a UE may have different machine learning capabilities (e.g., based on a number of modems, modules, and/or tasks that can be operated in a machine learning mode). In this regard, without knowing the specific machine learning capabilities (if any) supported by a UE, a base station may be unable to properly select the UEs that are able to perform one or more tasks in a machine learning mode in order to support federated learning. For example, existing wireless networks generally lack mechanisms to enable signal the machine learning or federated learning or artificial intelligence capabilities of a UE, which may cause a base station to configure federated learning tasks on a UE that lacks machine learning capabilities and/or underutilize computation resources on a UE that has robust machine learning capabilities, among other examples.

Some aspects described herein relate to techniques and apparatuses to signal the machine learning, federated learning, and/or artificial intelligence capabilities of a UE to a base station to enable federated learning in a wireless network. For example, in some aspects, a UE may transmit, to a base station, information that indicates the machine learning capabilities of the UE, which may include at least an indication of whether the UE supports machine learning algorithms. Furthermore, in cases where a UE supports machine learning tasks, the UE may further signal information that relates to a minimum time that the UE requires to switch between machine learning and non-machine learning tasks, a minimum time that the UE requires to change a configuration associated with a machine learning task (e.g., a change to one or more parameters associated with a wireless communication task or a user interface task configured to be performed in a machine learning mode), and/or communication parameters that the UE supports in the machine learning mode and/or a non-machine learning mode. In this way, the base station can use the capability information signaled by various UEs to better select the UEs that are to participate in federated learning and/or configure the tasks that the UEs are to perform to support the federated learning.

As indicated above, FIG. 3 is provided as an example. Other examples may differ from what is described with regard to FIG. 3.

Figure 4:
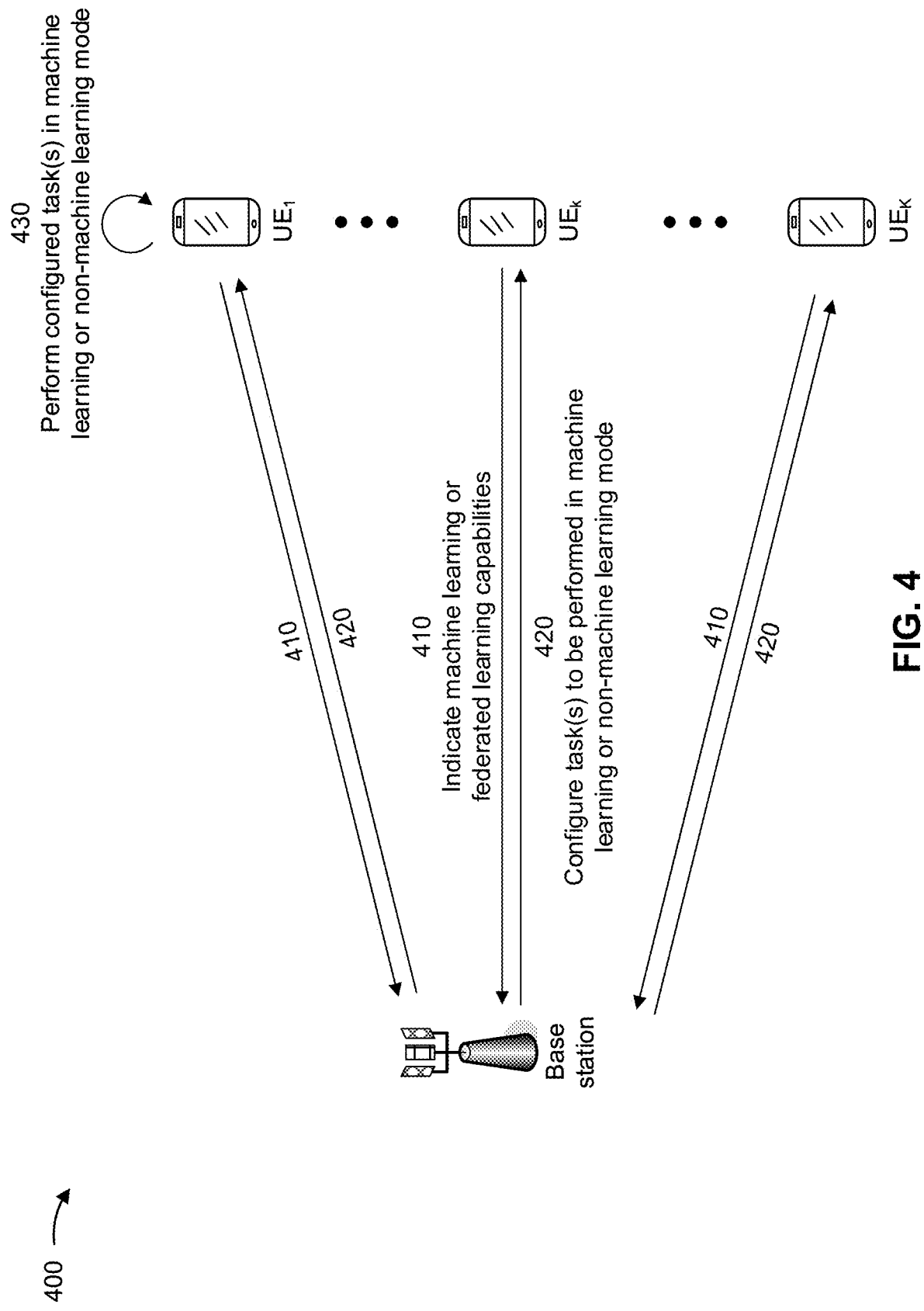
FIG. 4 is a diagram illustrating an example associated with UE signaling and capabilities to enable federated learning and switching between machine learning and non-machine learning tasks, in accordance with the present disclosure.

FIG. 4 is a diagram illustrating an example 400 associated with UE signaling and capabilities to enable federated learning and switching between machine learning and non-machine learning tasks, in accordance with the present disclosure. As shown in FIG. 4, example 400 includes communication between a base station and a set of K UEs (shown as "UE$_1$, . . . , UE$_k$, . . . , and UE$_K$") in a wireless network.

As shown in FIG. 4, and by reference number 410, each UE may transmit, to the base station, information that indicates whether the respective UE has a capability to support machine learning algorithms. For example, in some aspects, each UE may generally have a capability to support non-machine learning tasks (e.g., tasks performed in a non-machine learning mode), such as measuring downlink reference signals (e.g., a CSI-RS), transmitting uplink reference signals (e.g., an SRS), providing CSF in a CSI report, measuring received power of reference signals from a serving cell and/or neighbor cells, measuring signal strength of inter-radio access technology (e.g., WLAN) networks, measuring sensor signals for detecting locations of one or more objects within an environment, and/or collecting data related to user interactions with the UE, among other examples. Furthermore, in some cases, one or more UEs may have a capability to perform one or more tasks in a machine learning mode. Accordingly, because a UE generally needs to support machine learning algorithms in order to participate in federated learning, each UE may signal machine learning or federated learning capabilities to the base station (e.g., using radio resource control (RRC) signaling and/or a medium access control (MAC) control element (MAC-CE). For example, as described herein, the machine learning or federated learning capabilities may at least indicate whether a UE supports machine learning and/or federated learning algorithms. Furthermore, in some aspects, the machine learning or federated learning capabilities may vary over time for a particular UE (e.g., a UE may indicate support for machine learning algorithms when the UE is willing to participate in federated learning because the UE has computational resources available for local training, and may indicate that machine learning algorithms are unsupported at other times when the UE may be unwilling to participate in federated learning).

Furthermore, in cases where a UE supports machine learning and non-machine learning tasks (e.g., can operate in a machine learning mode or a non-machine learning mode), the capability information provided to the base station may further indicate a minimum time that the UE requires to switch between the machine learning mode and the non-machine learning mode. For example, in some aspects, the machine learning mode and the non-machine learning mode may be associated with different hardware components (e.g., modems, transmit chains, and/or receive antennas, among other examples) and/or different tasks (e.g., one or more tasks may be performed in the machine learning mode only, one or more tasks may be performed in the non-machine learning mode only, and/or one or more tasks may be performed in either the machine learning mode or the non-machine learning mode). Accordingly, a UE may be unable to switch from the machine learning mode to the non-machine learning mode (or vice versa) instantaneously because different hardware and/or software modules may need to be activated and/or deactivated in the different modes.

In some aspects, the capability information associated with a UE that supports machine learning algorithms may therefore indicate the minimum switching time that the UE needs to switch from the machine learning mode to the non-machine learning mode and vice versa. Furthermore, in some cases, the minimum switching time for switching from the machine learning mode to the non-machine learning mode may be the same as or different from the minimum switching time for switching from the non-machine learning mode to the machine learning mode. In some aspects, the minimum switching time(s) for switching between the machine learning mode and the non-machine learning mode may be sufficiently long to enable a UE to implement power control mechanisms to limit power consumption by enabling and/or disabling hardware blocks to support the target mode.

In this way, the base station may use the minimum switching time to determine which UEs to include or exclude from a federated learning procedure and/or a federated learning round. For example, if the base station needs feedback from a local training procedure within a threshold time that is shorter than the minimum time that a UE requires to switch from the machine learning mode to the non-machine learning mode, the UE may be excluded from a set of UEs that are configured to perform the local training procedure within the threshold time, but may be included in a set of UEs that are configured to perform the local training procedure after the minimum switching time. Furthermore, within the machine learning mode, a UE may signal a minimum time that the UE needs to switch or otherwise modify a configuration associated with one or more tasks performed in the machine learning mode (e.g., a change in a local loss function and/or any changes to the machine learning technique(s) used in the local training procedure). In this way, signaling the minimum time that the UE requires to switch between different modes and/or between different configurations in the machine learning mode may increase efficiency of the local training performed at the UEs that are participating in federated learning and enable coordination between the task(s) configured by the base station and how fast the UE can track and implement changes to the task(s) configured by the base station.

In some aspects, as described above, the machine learning mode and the non-machine learning mode may be associated with different hardware components, whereby the communication parameters supported by a UE may differ in the machine learning mode and the non-machine learning mode. Accordingly, in some aspects, the capability information signaled to the base station may indicate the communication parameters supported by the UE in the machine learning mode and the non-machine learning mode. For example, hardware components used in the machine learning mode may consume more power than hardware components used in the non-machine learning mode, whereby the UE may support different communication parameters per mode in order to maintain a power balance across the different modes. For example, a UE that supports machine learning algorithms may indicate a first set of communication parameters that the UE supports in the machine learning mode and a second set of communication parameters that the UE supports in the non-machine learning mode (e.g., different numbers of component carriers, different numbers of bandwidth parts per component carrier, different numbers of hybrid automatic repeat request (HARQ) processes that are associated local buffers to support HARQ combining, and/or different power headrooms per mode, among other examples).

As further shown in FIG. 4, and by reference number 420, the base station may transmit, and the UEs may receive, configuration information that indicates one or more tasks to be performed in the machine learning mode or the non-machine learning mode. For example, UEs that lack support for machine learning algorithms may be configured to perform wireless communication tasks and/or other suitable tasks in the non-machine learning mode only, and UEs that support machine learning algorithms may be configured to perform wireless communication tasks and/or other suitable tasks in the machine learning mode or the non-machine learning mode. Furthermore, in cases where a UE supports machine learning algorithms, the base station may take into consideration the current state of the UE (e.g., whether the UE is currently operating in the machine learning mode or the non-machine learning mode) and/or any applicable minimum switching times that the UE may require before performing a machine learning task. For example, the base station may configure one or more UEs to perform a task in the machine learning mode if the UE is currently operating in the machine learning mode, operating using a desired configuration for the task, and/or the minimum switching time for the UE satisfies a timing constraint that allows the UE to switch to the machine learning mode and/or the desired configuration for the task. Furthermore, in some aspects, the base station may configure the tasks to be performed by the UE based on the communication parameters that the UE supports in the desired mode.

As further shown in FIG. 4, and by reference number 430, each UE may perform the task(s) configured by the base station in the machine learning mode or the non-machine learning mode. For example, in some aspects, the task(s) that may be configured in the machine learning mode or the non-machine learning mode may be associated with a reference signal configuration that differs from one mode to another. For example, the base station may configure the same set of CSI-RS resources and/or SRS resources to be used for channel sounding in the machine learning mode and the non-machine learning mode, or the base station may configure different CSI-RS resources and/or SRS resources to be used for channel sounding in the machine learning mode and the non-machine learning mode. In either case, the base station and the UE may coordinate which CSI-RS and/or SRS resources are to be used in each mode, and the base station and the UE may further coordinate a format associated with a CSI report and/or a set of antennas or antenna groups used for sounding when the UE is operating in the machine learning mode or the non-machine learning mode.

For example, in some aspects, one or more CSI-RS resources may be used only in the machine learning mode and one or more CSI-RS resources may be used only in the non-machine learning mode. Accordingly, when the UE is configured to transmit a CSI report, the format and/or contents of the CSI report (e.g., reported CSF parameters) may depend on whether the UE is configured to measure CSI-RS and transmit a CSI report in the machine learning or non-machine learning mode. For example, using a particular CSI-RS resource set, the CSI report may be a sub-band report that provides more robust and detailed CSF in the machine learning mode (e.g., due to the higher computational capabilities that are available in the machine learning mode), whereas the CSI report may be a wideband report in the non-machine learning mode. Furthermore, in some aspects, the tasks that the UEs are configured to perform may include transmitting an SRS, where a UE may transmit the SRS using an SRS configuration that is associated with the machine learning mode or the non-machine learning mode. For example, the machine learning mode and the non-machine learning mode may be associated with different SRS configurations (e.g., different comb levels, different numbers of repetitions per SRS resource, and/or different numbers and/or combinations of antennas to be used for channel sounding, among other examples). Additionally, or alternatively, the machine learning mode and the non-machine learning mode may be associated with different xTyR configurations, where x represents a number of transmit chains that are available to use to transmit an SRS and y represents a total number of receive antennas. In this way, the UEs may be configured to transmit an SRS using an SRS configuration that is tailored to the particular mode in which the SRS is to be transmitted (e.g., to compensate for the high power consumption in the machine learning mode, which may reduce available UE battery power and/or limit a capability to use high transmit powers and/or antenna switching that may suffer from insertion loss). In this way, the base station can use the machine learning capability information signaled by various UEs to better select the UEs that are to participate in federated learning and/or configure the tasks that the UEs are to perform to support the federated learning, including the mode and/or configuration of the tasks that the UEs are to perform.

As indicated above, FIG. 4 is provided as an example. Other examples may differ from what is described with regard to FIG. 4.

Figure 5:
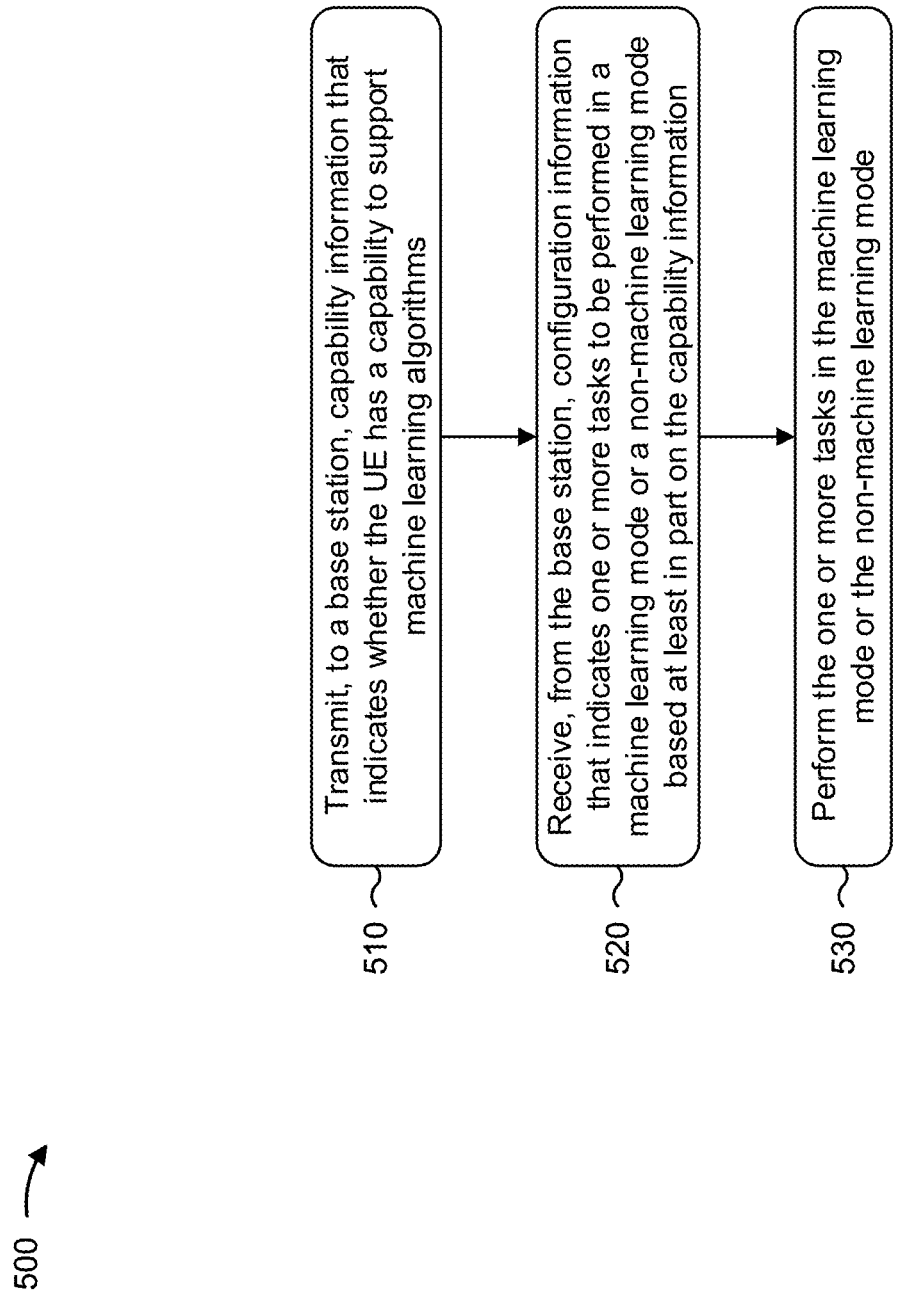
FIGS. 5-6 are diagrams illustrating example processes associated with UE signaling and capabilities to enable federated learning and switching between machine learning and non-machine learning tasks, in accordance with the present disclosure.

FIG. 5 is a diagram illustrating an example process 500 performed, for example, by a UE, in accordance with the present disclosure. Example process 500 is an example where the UE (e.g., UE 120) performs operations associated with UE signaling and capabilities to enable federated learning and switching between machine learning and non-machine learning related tasks.

As shown in FIG. 5, in some aspects, process 500 may include transmitting, to a base station, capability information that indicates whether the UE has a capability to support machine learning algorithms (block 510). For example, the UE (e.g., using communication manager 140 and/or transmission component 704, depicted in FIG. 7) may transmit, to a base station, capability information that indicates whether the UE has a capability to support machine learning algorithms, as described above.

As further shown in FIG. 5, in some aspects, process 500 may include receiving, from the base station, configuration information that indicates one or more tasks to be performed in a machine learning mode or a non-machine learning mode based at least in part on the capability information (block 520). For example, the UE (e.g., using communication manager 140 and/or reception component 702, depicted in FIG. 7) may receive, from the base station, configuration information that indicates one or more tasks to be performed in a machine learning mode or a non-machine learning mode based at least in part on the capability information, as described above.

As further shown in FIG. 5, in some aspects, process 500 may include performing the one or more tasks in the machine learning mode or the non-machine learning mode (block 530). For example, the UE (e.g., using communication manager 140 and/or performance component 708, depicted in FIG. 7) may perform the one or more tasks in the machine learning mode or the non-machine learning mode, as described above.

Process 500 may include additional aspects, such as any single aspect or any combination of aspects described below and/or in connection with one or more other processes described elsewhere herein.

In a first aspect, the capability information further indicates a minimum time to switch from the machine learning mode to the non-machine learning mode or from the non-machine learning mode to the machine learning mode.

In a second aspect, alone or in combination with the first aspect, the one or more tasks include measuring a CSI-RS according to a CSI-RS configuration associated with the machine learning mode or the non-machine learning mode.

In a third aspect, alone or in combination with one or more of the first and second aspects, the one or more tasks include transmitting a CSI report associated with the machine learning mode or the non-machine learning mode.

In a fourth aspect, alone or in combination with one or more of the first through third aspects, the one or more tasks include transmitting an SRS according to an SRS configuration associated with the machine learning mode or the non-machine learning mode.

In a fifth aspect, alone or in combination with one or more of the first through fourth aspects, the capability information further indicates a first set of communication parameters that the UE supports in the machine learning mode and a second set of communication parameters that the UE supports in the non-machine learning mode.

In a sixth aspect, alone or in combination with one or more of the first through fifth aspects, the capability information further indicates a minimum time to switch between configurations associated with one or more tasks that are performed in the machine learning mode.

In a seventh aspect, alone or in combination with one or more of the first through sixth aspects, the capability information is transmitted via RRC signaling or a MAC-CE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
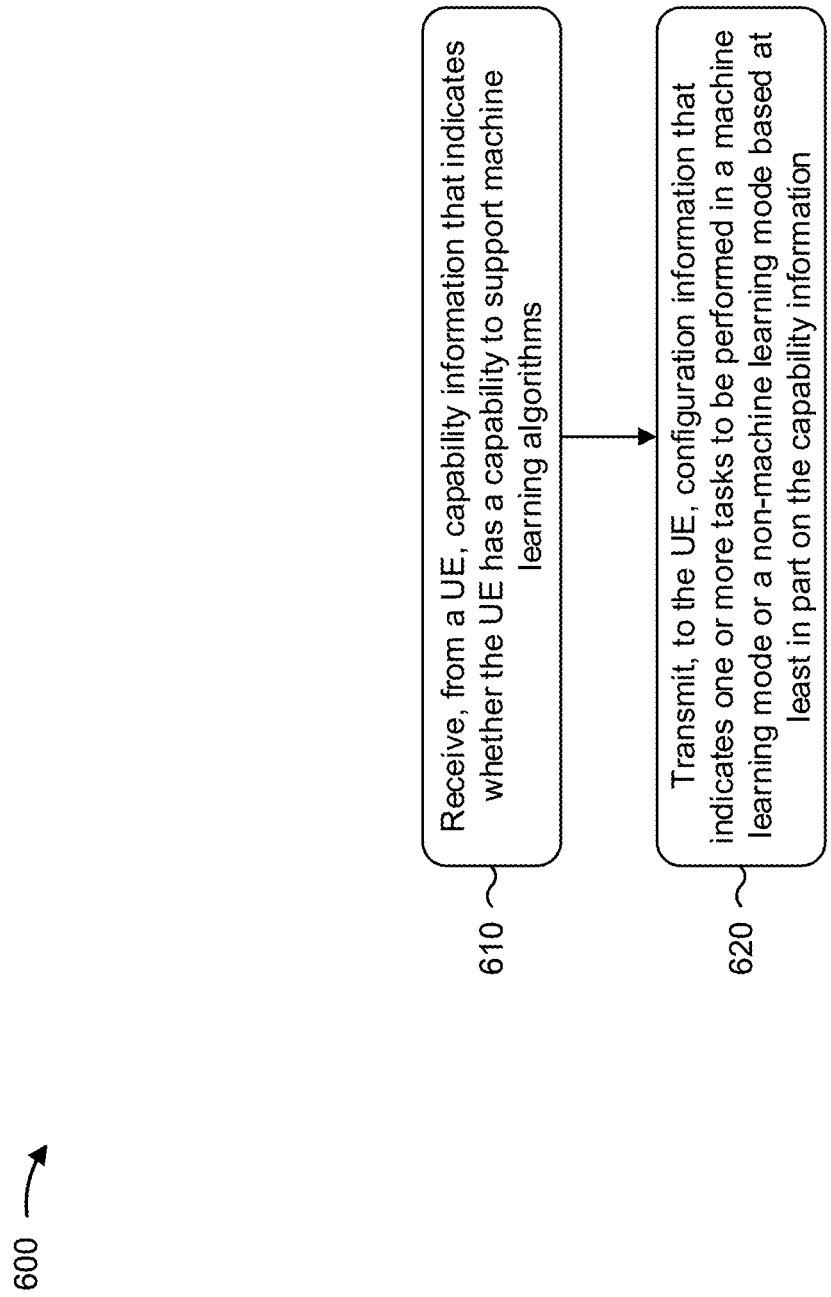

FIG. 6 is a diagram illustrating an example process 600 performed, for example, by a base station, in accordance with the present disclosure. Example process 600 is an example where the base station (e.g., base station 110) performs operations associated with user equipment signaling and capabilities to enable federated learning and switching between machine learning and non-machine learning related tasks.

As shown in FIG. 6, in some aspects, process 600 may include receiving, from a UE, capability information that indicates whether the UE has a capability to support machine learning algorithms (block 610). For example, the base station (e.g., using communication manager 150 and/or reception component 802, depicted in FIG. 8) may receive, from a UE, capability information that indicates whether the UE has a capability to support machine learning algorithms, as described above.

As further shown in FIG. 6, in some aspects, process 600 may include transmitting, to the UE, configuration information that indicates one or more tasks to be performed in a machine learning mode or a non-machine learning mode based at least in part on the capability information (block 620). For example, the base station (e.g., using communication manager 150 and/or transmission component 804, depicted in FIG. 8) may transmit, to the UE, configuration information that indicates one or more tasks to be performed in a machine learning mode or a non-machine learning mode based at least in part on the capability information, as described above.

Process 600 may include additional aspects, such as any single aspect or any combination of aspects described below and/or in connection with one or more other processes described elsewhere herein.

In a first aspect, the capability information further indicates a minimum time to switch from the machine learning mode to the non-machine learning mode or from the non-machine learning mode to the machine learning mode.

In a second aspect, alone or in combination with the first aspect, the configuration information causes the UE to measure a CSI-RS according to a CSI-RS configuration associated with the machine learning mode or the non-machine learning mode.

In a third aspect, alone or in combination with one or more of the first and second aspects, the configuration information causes the UE to transmit a CSI report associated with the machine learning mode or the non-machine learning mode.

In a fourth aspect, alone or in combination with one or more of the first through third aspects, the configuration information causes the UE to transmit an SRS according to an SRS configuration associated with the machine learning mode or the non-machine learning mode.

In a fifth aspect, alone or in combination with one or more of the first through fourth aspects, the capability information further indicates a first set of communication parameters that the UE supports in the machine learning mode and a second set of communication parameters that the UE supports in the non-machine learning mode.

In a sixth aspect, alone or in combination with one or more of the first through fifth aspects, the capability information further indicates a minimum time to switch between configurations associated with one or more tasks that are performed in the machine learning mode.

In a seventh aspect, alone or in combination with one or more of the first through sixth aspects, the capability information is received via RRC signaling or a MAC-CE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
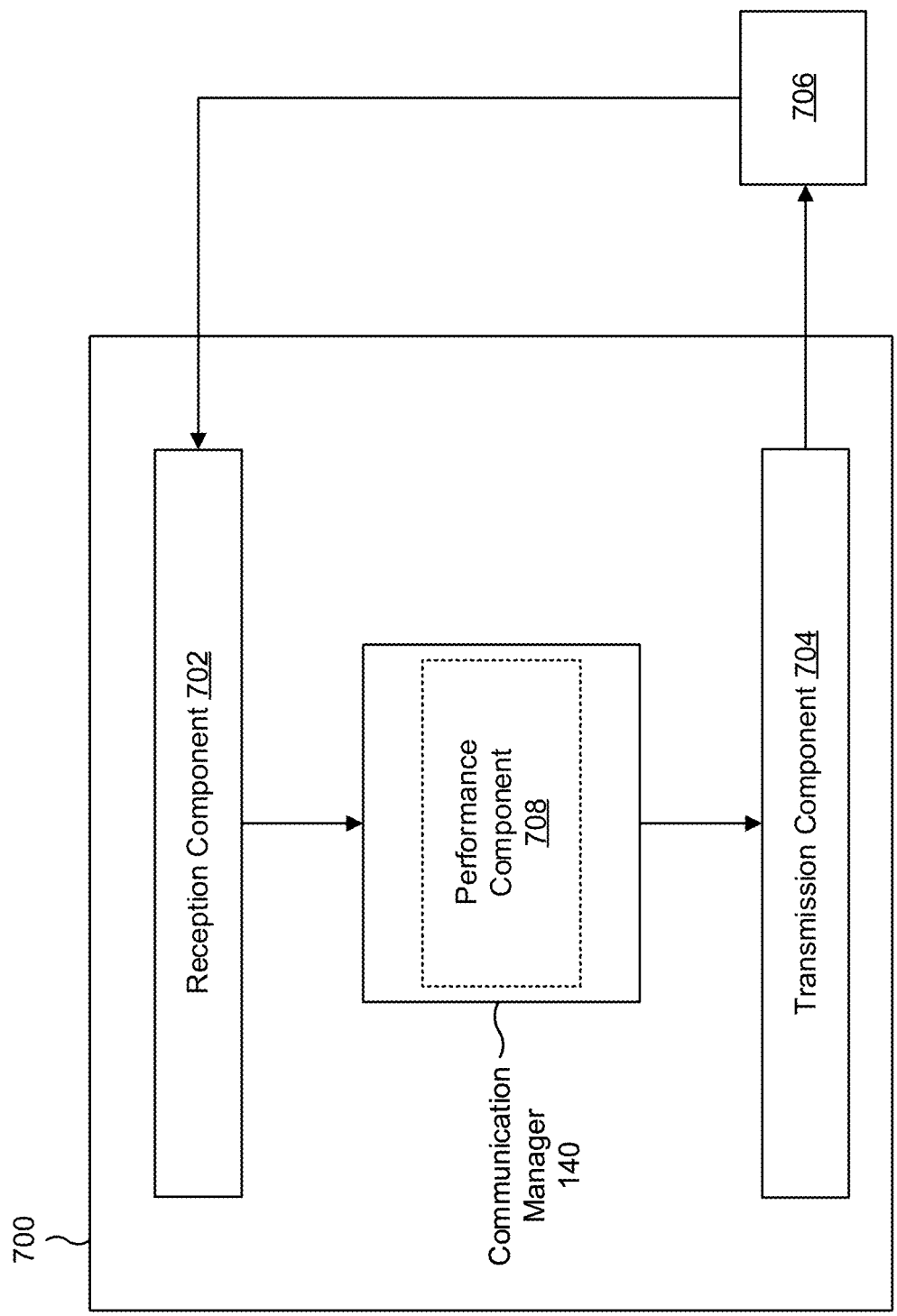
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a performance component 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2.

Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit, to a base station, capability information that indicates whether the UE has a capability to support machine learning algorithms. The reception component 702 may receive, from the base station, configuration information that indicates one or more tasks to be performed in a machine learning mode or a non-machine learning mode based at least in part on the capability information. The performance component 708 may perform the one or more tasks in the machine learning mode or the non-machine learning mode.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
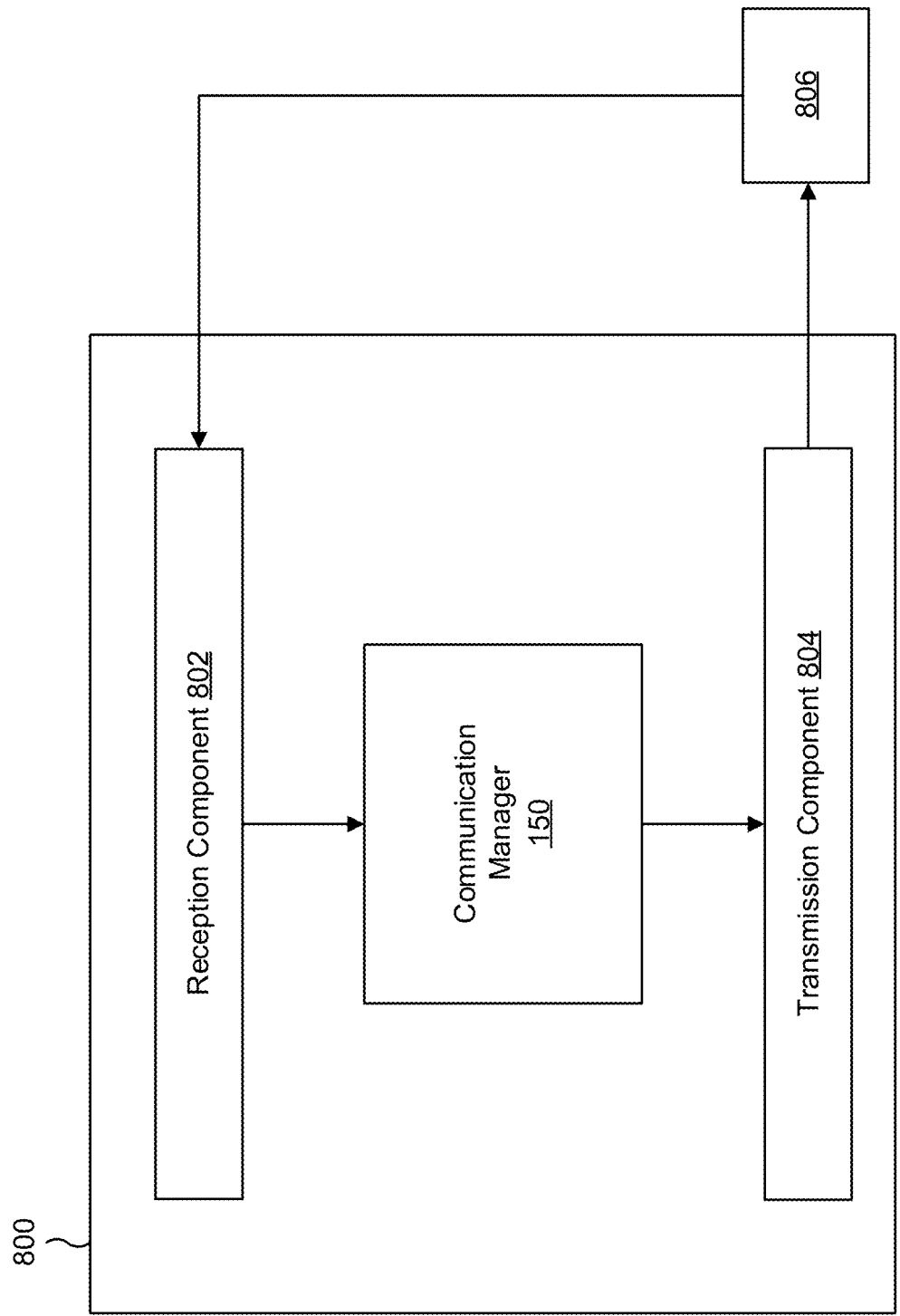

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The reception component 802 may receive, from a UE, capability information that indicates whether the UE has a capability to support machine learning algorithms. The transmission component 804 may transmit, to the UE, configuration information that indicates one or more tasks to be performed in a machine learning mode or a non-machine learning mode based at least in part on the capability information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: transmitting, to a base station, capability information that indicates whether the UE has a capability to support machine learning algorithms; receiving, from the base station, configuration information that indicates one or more tasks to be performed in a machine learning mode or a non-machine learning mode based at least in part on the capability information; and performing the one or more tasks in the machine learning mode or the non-machine learning mode.

Aspect 2: The method of Aspect 1, wherein the capability information further indicates a minimum time to switch from the machine learning mode to the non-machine learning mode or from the non-machine learning mode to the machine learning mode.

Aspect 3: The method of any of Aspects 1-2, wherein the one or more tasks include measuring a CSI-RS according to a CSI-RS configuration associated with the machine learning mode or the non-machine learning mode.

Aspect 4: The method of any of Aspects 1-3, wherein the one or more tasks include transmitting a CSI report associated with the machine learning mode or the non-machine learning mode.

Aspect 5: The method of any of Aspects 1-4, wherein the one or more tasks include transmitting an SRS according to an SRS configuration associated with the machine learning mode or the non-machine learning mode.

Aspect 6: The method of any of Aspects 1-5, wherein the capability information further indicates a first set of communication parameters that the UE supports in the machine learning mode and a second set of communication parameters that the UE supports in the non-machine learning mode.

Aspect 7: The method of any of Aspects 1-6, wherein the capability information further indicates a minimum time to switch between configurations associated with one or more tasks that are performed in the machine learning mode.

Aspect 8: The method of any of Aspects 1-7, wherein the capability information is transmitted via RRC signaling or a MAC-CE.

Aspect 9: A method of wireless communication performed by a base station, comprising: receiving, from a UE, capability information that indicates whether the UE has a capability to support machine learning algorithms; and transmitting, to the UE, configuration information that indicates one or more tasks to be performed in a machine learning mode or a non-machine learning mode based at least in part on the capability information.

Aspect 10: The method of Aspect 9, wherein the capability information further indicates a minimum time to switch from the machine learning mode to the non-machine learning mode or from the non-machine learning mode to the machine learning mode.

Aspect 11: The method of any of Aspects 9-10, wherein the configuration information causes the UE to measure a CSI-RS according to a CSI-RS configuration associated with the machine learning mode or the non-machine learning mode.

Aspect 12: The method of any of Aspects 9-11, wherein the configuration information causes the UE to transmit a CSI report associated with the machine learning mode or the non-machine learning mode.

Aspect 13: The method of any of Aspects 9-12, wherein the configuration information causes the UE to transmit an SRS according to an SRS configuration associated with the machine learning mode or the non-machine learning mode.

Aspect 14: The method of any of Aspects 9-13, wherein the capability information further indicates a first set of communication parameters that the UE supports in the machine learning mode and a second set of communication parameters that the UE supports in the non-machine learning mode.

Aspect 15: The method of any of Aspects 9-14, wherein the capability information further indicates a minimum time to switch between configurations associated with one or more tasks that are performed in the machine learning mode.

Aspect 16: The method of Aspect 9, wherein the capability information is received via RRC signaling or a MAC-CE.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting, to a base station, capability information that indicates whether the UE has a capability to support machine learning algorithms, wherein the capability information indicates a minimum time to switch from the machine learning mode to the non-machine learning mode or from the non-machine learning mode to the machine learning mode;
receiving, from the base station, configuration information that indicates one or more tasks to be performed in a machine learning mode or a non-machine learning mode based at least in part on the capability information; and
performing the one or more tasks in the machine learning mode or the non-machine learning mode.

2. The method of claim 1, wherein the one or more tasks include measuring a channel state information reference signal (CSI-RS) according to a CSI-RS configuration associated with the machine learning mode or the non-machine learning mode.

3. The method of claim 1, wherein the one or more tasks include transmitting a channel state information report associated with the machine learning mode or the non-machine learning mode.

4. The method of claim 1, wherein the one or more tasks include transmitting a sounding reference signal (SRS) according to an SRS configuration associated with the machine learning mode or the non-machine learning mode.

5. The method of claim 1, wherein the capability information further indicates a first set of communication parameters that the UE supports in the machine learning mode and a second set of communication parameters that the UE supports in the non-machine learning mode.

6. The method of claim 1, wherein the capability information further indicates a minimum time to switch between configurations associated with one or more tasks that are performed in the machine learning mode.

7. The method of claim 1, wherein the capability information is transmitted via radio resource control signaling or a medium access control element.

8. A method of wireless communication performed by a base station, comprising:
receiving, from a user equipment (UE), capability information that indicates whether the UE has a capability to support machine learning algorithms, wherein the capability information indicates a minimum time to switch from the machine learning mode to the non-machine learning mode or from the non-machine learning mode to the machine learning mode; and
transmitting, to the UE, configuration information that indicates one or more tasks to be performed in a machine learning mode or a non-machine learning mode based at least in part on the capability information.

9. The method of claim 8, wherein the configuration information causes the UE to measure a channel state information reference signal (CSI-RS) according to a CSI-RS configuration associated with the machine learning mode or the non-machine learning mode.

10. The method of claim 8, wherein the configuration information causes the UE to transmit a channel state information report associated with the machine learning mode or the non-machine learning mode.

11. The method of claim 8, wherein the configuration information causes the UE to transmit a sounding reference signal (SRS) according to an SRS configuration associated with the machine learning mode or the non-machine learning mode.

12. The method of claim 8, wherein the capability information further indicates a first set of communication parameters that the UE supports in the machine learning mode and a second set of communication parameters that the UE supports in the non-machine learning mode.

13. The method of claim 8, wherein the capability information further indicates a minimum time to switch between configurations associated with one or more tasks that are performed in the machine learning mode.

14. The method of claim 8, wherein the capability information is received via radio resource control signaling or a medium access control control element.

15. A user equipment (UE) for wireless communication, comprising:
a memory; and
one or more processors, coupled to the memory, configured to:
transmit, to a base station, capability information that indicates whether the UE has a capability to support machine learning algorithms, wherein the capability information indicates a minimum time to switch from the machine learning mode to the non-machine learning mode or from the non-machine learning mode to the machine learning mode;
receive, from the base station, configuration information that indicates one or more tasks to be performed in a machine learning mode or a non-machine learning mode based at least in part on the capability information; and
perform the one or more tasks in the machine learning mode or the non-machine learning mode.

16. The UE of claim 15, wherein the one or more tasks include measuring a channel state information reference signal (CSI-RS) according to a CSI-RS configuration associated with the machine learning mode or the non-machine learning mode.

17. The UE of claim 15, wherein the one or more tasks include transmitting a channel state information report associated with the machine learning mode or the non-machine learning mode.

18. The UE of claim 15, wherein the one or more tasks include transmitting a sounding reference signal (SRS)

according to an SRS configuration associated with the machine learning mode or the non-machine learning mode.

19. The UE of claim 15, wherein the capability information further indicates a first set of communication parameters that the UE supports in the machine learning mode and a second set of communication parameters that the UE supports in the non-machine learning mode.

20. The UE of claim 15, wherein the capability information further indicates a minimum time to switch between configurations associated with one or more tasks that are performed in the machine learning mode.

21. A base station for wireless communication, comprising:
   a memory; and
   one or more processors, coupled to the memory, configured to:
   receive, from a user equipment (UE), capability information that indicates whether the UE has a capability to support machine learning algorithms, wherein the capability information indicates a minimum time to switch from the machine learning mode to the non-machine learning mode or from the non-machine learning mode to the machine learning mode; and
   transmit, to the UE, configuration information that indicates one or more tasks to be performed in a machine learning mode or a non-machine learning mode based at least in part on the capability information.

22. The base station of claim 21, wherein the configuration information causes the UE to measure a channel state information reference signal (CSI-RS) according to a CSI-RS configuration associated with the machine learning mode or the non-machine learning mode.

23. The base station of claim 21, wherein the configuration information causes the UE to transmit a channel state information report associated with the machine learning mode or the non-machine learning mode.

24. The base station of claim 21, wherein the configuration information causes the UE to transmit a sounding reference signal (SRS) according to an SRS configuration associated with the machine learning mode or the non-machine learning mode.

25. The base station of claim 21, wherein the capability information further indicates a first set of communication parameters that the UE supports in the machine learning mode and a second set of communication parameters that the UE supports in the non-machine learning mode.

26. The base station of claim 21, wherein the capability information further indicates a minimum time to switch between configurations associated with one or more tasks that are performed in the machine learning mode.

* * * * *